(12) United States Patent
Zhao et al.

(10) Patent No.: US 11,403,784 B2
(45) Date of Patent: Aug. 2, 2022

(54) METHOD AND APPARATUS FOR TREE-BASED POINT CLOUD COMPRESSION (PCC) MEDIA STREAM USING MOVING PICTURE EXPERTS GROUP (MPEG)-DYNAMIC ADAPTIVE STREAMING OVER HTTP (DASH)

(71) Applicant: TENCENT AMERICA LLC, Palo Alto, CA (US)

(72) Inventors: Shuai Zhao, Pleasanton, CA (US); Iraj Sodagar, Los Angeles, CA (US); Shan Liu, San Jose, CA (US); Byeongdoo Choi, Palo Alto, CA (US); Sehoon Yea, Palo Alto, CA (US); Arash Vosoughi, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 317 days.

(21) Appl. No.: 16/822,198

(22) Filed: Mar. 18, 2020

(65) Prior Publication Data
US 2020/0302654 A1 Sep. 24, 2020

Related U.S. Application Data

(60) Provisional application No. 62/820,683, filed on Mar. 19, 2019.

(51) Int. Cl.
*G06T 9/40* (2006.01)
*H04N 19/184* (2014.01)
(Continued)

(52) U.S. Cl.
CPC .............. *G06T 9/40* (2013.01); *G06T 17/005* (2013.01); *H04N 19/184* (2014.11); *H04N 19/96* (2014.11)

(58) Field of Classification Search
None
See application file for complete search history.

(56) References Cited

U.S. PATENT DOCUMENTS

| 8,682,849 B2 * | 3/2014 | Mostafa ................ H04L 67/306 707/636 |
| 10,541,929 B2 * | 1/2020 | Muñoz De La Torre Alonso ....... H04L 65/80 |

(Continued)

OTHER PUBLICATIONS

Written Opinion of the International Searching Authority dated Jun. 3, 2020, in International Application No. PCT/US20/23560.

(Continued)

*Primary Examiner* — Anand P Bhatnagar
(74) *Attorney, Agent, or Firm* — Sughrue Mion, PLLC

(57) ABSTRACT

A method of obtaining a tree-based point cloud compression (PCC) media stream using moving picture experts group (MPEG)-dynamic adaptive streaming over http (DASH), is performed by at least one processor and includes obtaining, from a server, a media representation description (MPD) comprising a PCC uniform resource indicator (URI) and a PCC three-dimensional (3D) descriptor, and determining whether the PCC URI comprised in the obtained MPD indicates that the tree-based PCC media stream is to be accessed. The method further includes, based on the PCC URI being determined to indicate that the tree-based PCC media stream is to be accessed, obtaining, from the server, the tree-based PCC media stream, using the PCC 3D descriptor comprised in the obtained MPD.

20 Claims, 5 Drawing Sheets

(51) Int. Cl.
    *G06T 17/00*     (2006.01)
    *H04N 19/96*     (2014.01)

(56) References Cited

U.S. PATENT DOCUMENTS

| | | | |
|---|---|---|---|
| 10,834,391 B2* | 11/2020 | Chou | G06T 15/08 |
| 2009/0231327 A1 | 9/2009 | Minear et al. | |
| 2018/0137224 A1* | 5/2018 | Hemmer | G06T 9/00 |
| 2018/0270160 A1* | 9/2018 | Muñoz De La Torre Alonso | H04W 28/0268 |
| 2018/0293247 A1* | 10/2018 | Thakkar | G06F 16/188 |
| 2018/0359507 A1* | 12/2018 | Oh | H04N 21/64322 |
| 2019/0080483 A1 | 3/2019 | Mammou et al. | |
| 2021/0105313 A1* | 4/2021 | Wang | H04N 21/85406 |
| 2021/0407142 A1* | 12/2021 | Hur | H04N 19/30 |
| 2022/0058834 A1* | 2/2022 | Iguchi | G06T 9/001 |

OTHER PUBLICATIONS

International Search Report dated Jun. 3, 2020, in International Application No. PCT/US20/23560.

* cited by examiner

METHOD AND APPARATUS FOR TREE-BASED POINT CLOUD COMPRESSION (PCC) MEDIA STREAM USING MOVING PICTURE EXPERTS GROUP (MPEG)-DYNAMIC ADAPTIVE STREAMING OVER HTTP (DASH)

CROSS-REFERENCE TO RELATED APPLICATION

This application claims priority from U.S. Provisional Patent Application No. 62/820,683, filed on Mar. 19, 2019, in the U.S. Patent and Trademark Office, the disclosure of which is incorporated herein by reference in its entirety.

BACKGROUND

Streaming point cloud data has tremendous challenges due to volumetric size of the point cloud data and network bandwidth limitations. Thus, to provide viewers a high-quality, three-dimensional (3D) experience, a new streaming schema for such media content is needed. However, streaming point cloud-based, immersive video content over the modern network has not been broadly studied, and support of streaming such data-intensive video content in current Moving Picture Experts Group (MPEG) standards has not been well-provided.

For example, the MPEG-Dynamic Adaptive Streaming Over HTTP (DASH) standard is becoming a key streaming technology for both live and video-on-demand use cases. The MPEG-DASH standard adopts a dynamic adaptive schema for two-dimensional (2D) media streaming. Even for 360-degree/virtual reality (VR) content, the MPEG-DASH standard has a standardized spatial-resolution descriptor (SRD) to represent spatial relationships of streams. With the SRD, omnidirectional video content can be divided to a various number of slices/tiles and streamed based on a user's region of interests. However, support for real 3D space media streaming is missing.

SUMMARY

According to embodiments, a method of obtaining a tree-based point cloud compression (PCC) media stream using moving picture experts group (MPEG)-dynamic adaptive streaming over http (DASH), is performed by at least one processor and includes obtaining, from a server, a media representation description (MPD) comprising a PCC uniform resource indicator (URI) and a PCC three-dimensional (3D) descriptor, and determining whether the PCC URI comprised in the obtained MPD indicates that the tree-based PCC media stream is to be accessed. The method further includes, based on the PCC URI being determined to indicate that the tree-based PCC media stream is to be accessed, obtaining, from the server, the tree-based PCC media stream, using the PCC 3D descriptor comprised in the obtained MPD.

According to embodiments, an apparatus for obtaining a tree-based point cloud compression (PCC) media stream using moving picture experts group (MPEG)-dynamic adaptive streaming over http (DASH), includes at least one memory configured to store program code, and at least one processor configured to read the program code and operate as instructed by the program code. The program code includes first obtaining code configured to cause the at least one processor to obtain, from a server, a media representation description (MPD) comprising a PCC uniform resource indicator (URI) and a PCC three-dimensional (3D) descriptor, and determining code configured to cause the at least one processor to determine whether the PCC URI comprised in the obtained MPD indicates that the tree-based PCC media stream is to be accessed. The program code further includes second obtaining code configured to cause the at least one processor to, based on the PCC URI being determined to indicate that the tree-based PCC media stream is to be accessed, obtain, from the server, the tree-based PCC media stream, using the PCC 3D descriptor comprised in the obtained MPD.

According to embodiments, a non-transitory computer-readable medium stores instructions that, when executed by at least one processor of an apparatus for obtaining a tree-based point cloud compression (PCC) media stream using moving picture experts group (MPEG)-dynamic adaptive streaming over http (DASH), cause the at least one processor to obtain, from a server, a media representation description (MPD) comprising a PCC uniform resource indicator (URI) and a PCC three-dimensional (3D) descriptor. The instructions further cause the at least one processor to determine whether the PCC URI comprised in the obtained MPD indicates that the tree-based PCC media stream is to be accessed, and based on the PCC URI being determined to indicate that the tree-based PCC media stream is to be accessed, obtain, from the server, the tree-based PCC media stream, using the PCC 3D descriptor comprised in the obtained MPD.

DETAILED DESCRIPTION

The advancement of PCC makes streaming point cloud-based, immersive video content realistic. Embodiments described herein include performing tree-based PCC on multi-resolution media content for a point cloud media stream. Such a tree-based PCC includes, for example, octree-based, k-dimensional tree-based and/or quadtree-based PCC. Each of these PCC methods use a common binary data structure and provide a high compression efficiency.

The embodiments further include using the adaptive streaming schema of the current MPEG-DASH standard with a description schema to describe a media stream in a 3D space. Assumptions are a) compression data is in a tree-based spatial data structure and, b) only a small part of the data is essential at any given time for a point of view, which is valid in both 2D and 3D media streams.

In detail, a Uniform Resource Identifier titled "schemeIdUri" is incorporated within the existing MPEG-DASH standard to signal a point cloud media stream. Further, a 3D descriptor is incorporated in the current MPEG-DASH standard to describe, or be a template for, a tree-based PCC media stream.

Figure 1:
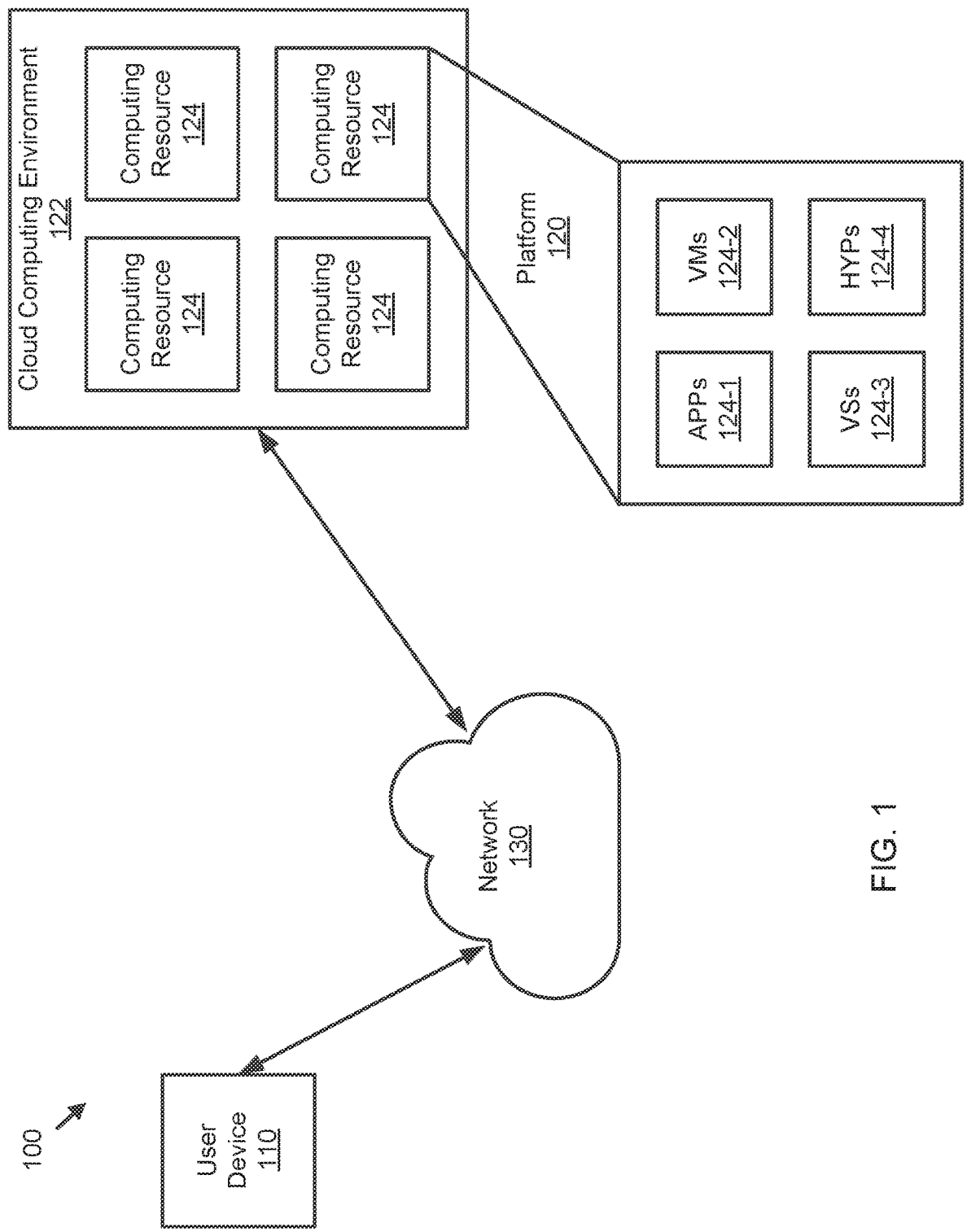
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
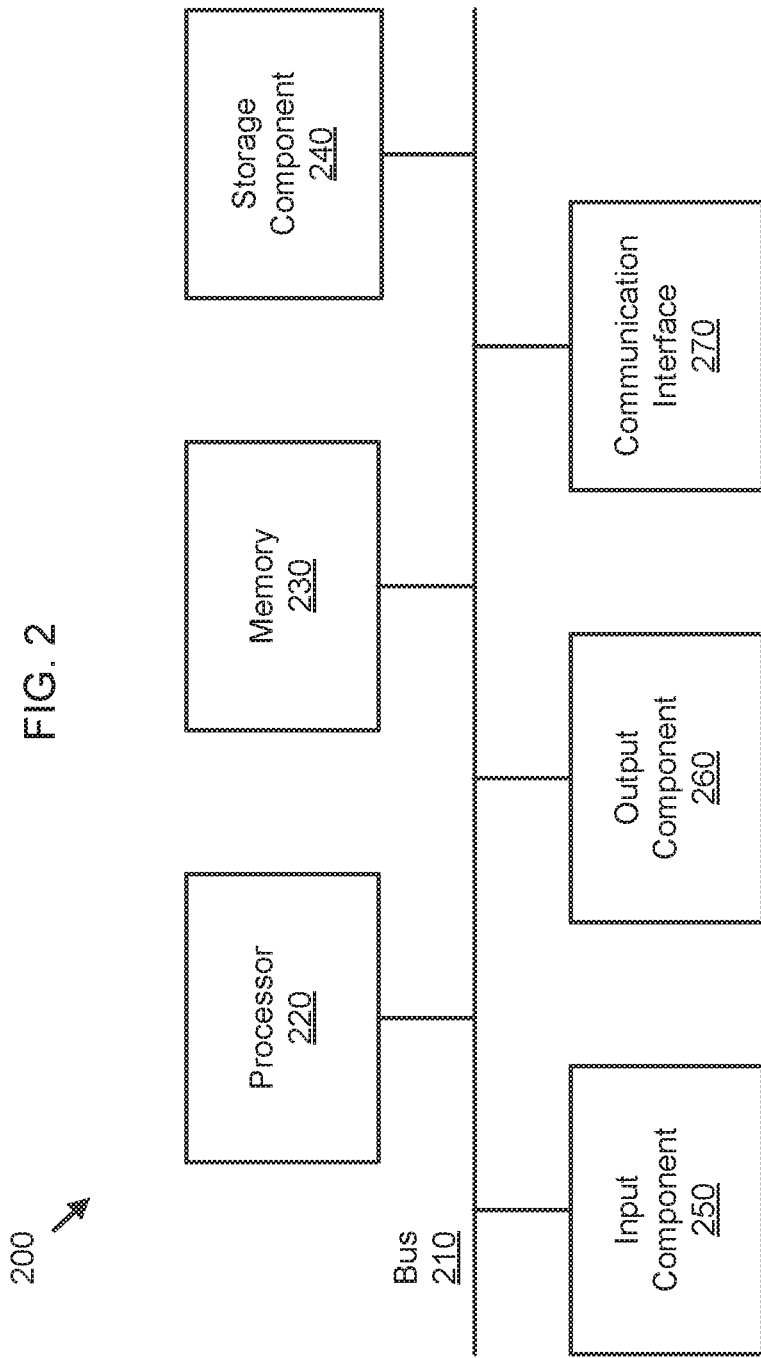
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
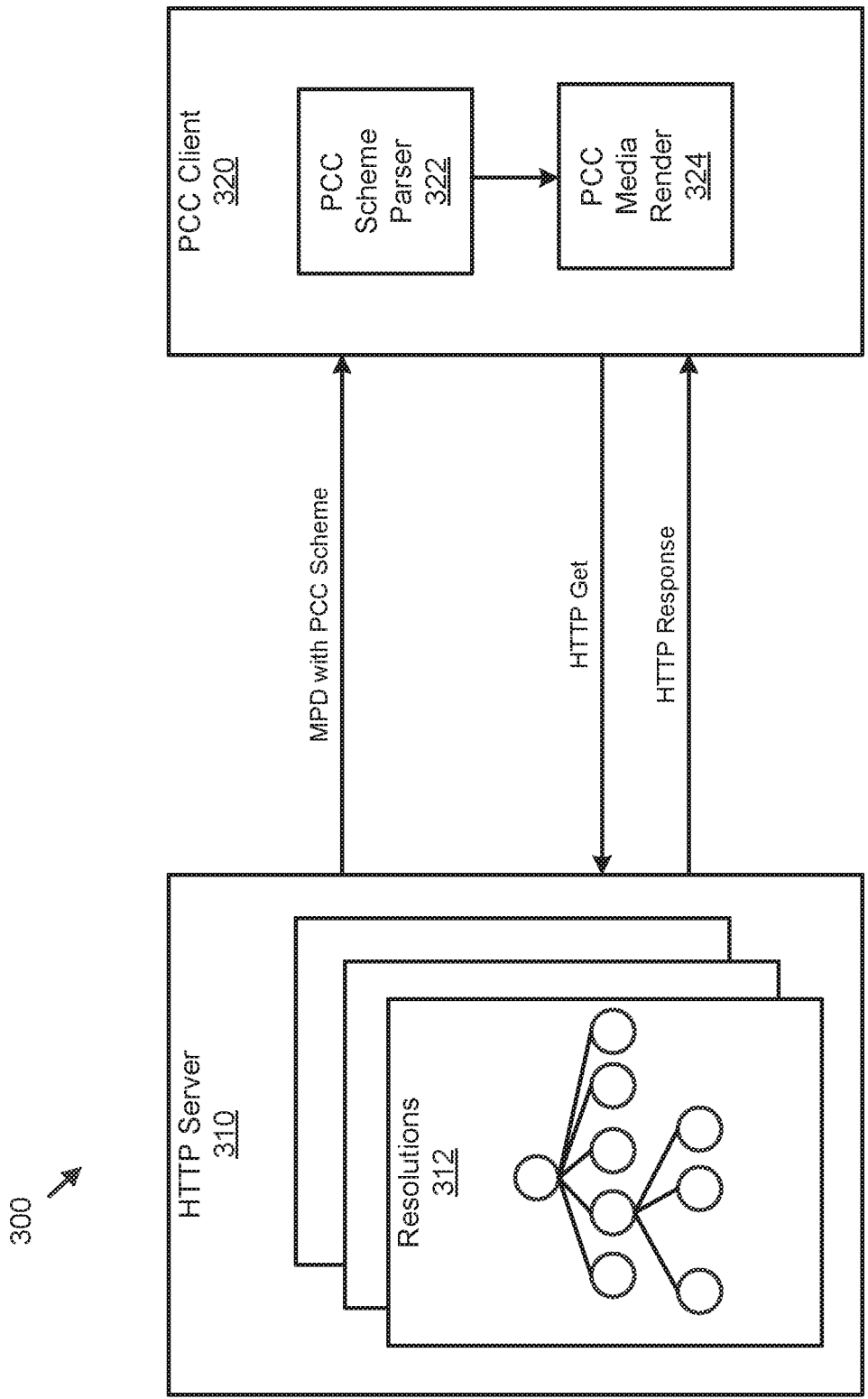
FIG. 3 is a block diagram of a point cloud compression (PCC) streaming system, using MPEG-DASH, according to embodiments.

FIG. 3 is a block diagram of a PCC streaming system 300, using MPEG-DASH, according to embodiments.

Referring to FIG. 3, the PCC streaming system 300 includes a Hypertext Transfer Protocol (HTTP) server 310 and a PCC client 320. The PCC client 320 may include any electronic device, such as, for example, a smartphone, a tablet computer, a laptop computer and a personal computer (PC). Each of the HTTP server 310 and the PCC client 320 may be implemented by the device 200 of FIG. 2.

The HTTP server 310 transmits, to the PCC client 320, a media representation description (MPD) file with a PCC scheme for streaming a tree-based PCC media stream. A format of the MPD file may be included in the MPEG-DASH standard.

The PCC scheme is included inside an existing "EssentialProperty" tag of the MPEG-DASH standard, and is used to signal the PCC media stream. A meaning of each property element of the PCC scheme is described in Table 1:

TABLE 1

| PCC Scheme for describing PCC Stream | | |
| --- | --- | --- |
| Descriptor | Definition | Value |
| schemeIdUri | Identifier (ID) and/or URI for signalling PCC media stream | Unsigned Integer |
| format | PCC media stream format such as BINARY, LiDAR binary file formats LAS and LAZ, and PLY (Polygon File Format) | Unsigned Integer |
| value | PCC media stream 3D descriptor | String |

In the PCC scheme, the 3D descriptor can be used for any type of tree-based PCC media stream. A meaning of this <x,y,z> descriptor is described in Table 2:

TABLE 2

| Descriptor | Definition | Value |
| --- | --- | --- |
| | PCC Media Stream 3D Descriptor | |
| R | Root | Unsigned Integer |
| L | Tree level | Unsigned Integer |
| C | Order of child in current tree level | Unsigned Integer |

Based on the <R,L,C> descriptor, any tree-based PCC media stream can be fetched based on a user's view window. The 3D descriptor serves as an address for the tree-based PCC media stream.

The following depicts where the PCC scheme resides in the MPEG-DASH standard:

```
<AdaptationSet>
  <Representation>
    <EssentialProperty schemeIdUri="urn:mpeg:dash:pcc"
    format="", value="R,L,C"/>
  </Representation>
</AdaptationSet>
```

Referring again to FIG. 3, the PCC client 320 includes a PCC scheme parser 322 and a PCC media render 324. The PCC scheme parser 322 obtains the MPD with the PCC scheme from the HTTP server 310, and parses the PCC scheme to determine whether a schemeIdUri descriptor indicates that a tree-based PCC media stream is to be accessed. Based on the schemeIdUri descriptor being determined to indicate that the tree-based PCC media stream is to be accessed, the PCC scheme parser 322 fetches the tree-based PCC media stream, using the PCC media stream 3D descriptor included in the PCC scheme. The tree-based PCC media stream is fetched further using an HTTP get message that is transmitted from the PCC client 320 to the HTTP server 310, the HTTP get message comprising the 3D descriptor.

The PCC media render 324 obtains the tree-based PCC media stream from the HTTP server 310 including various resolutions 312 of tree-based PCC media streams. The tree-based PCC media stream is obtained using an HTTP response message that is transmitted from the HTTP server 310 to the PCC client 320, the HTTP response message comprising the tree-based PCC media stream. The PCC media render 324 renders the obtained tree-based PCC media stream for display on a display, such as the output component 260 of FIG. 2.

Figure 4:
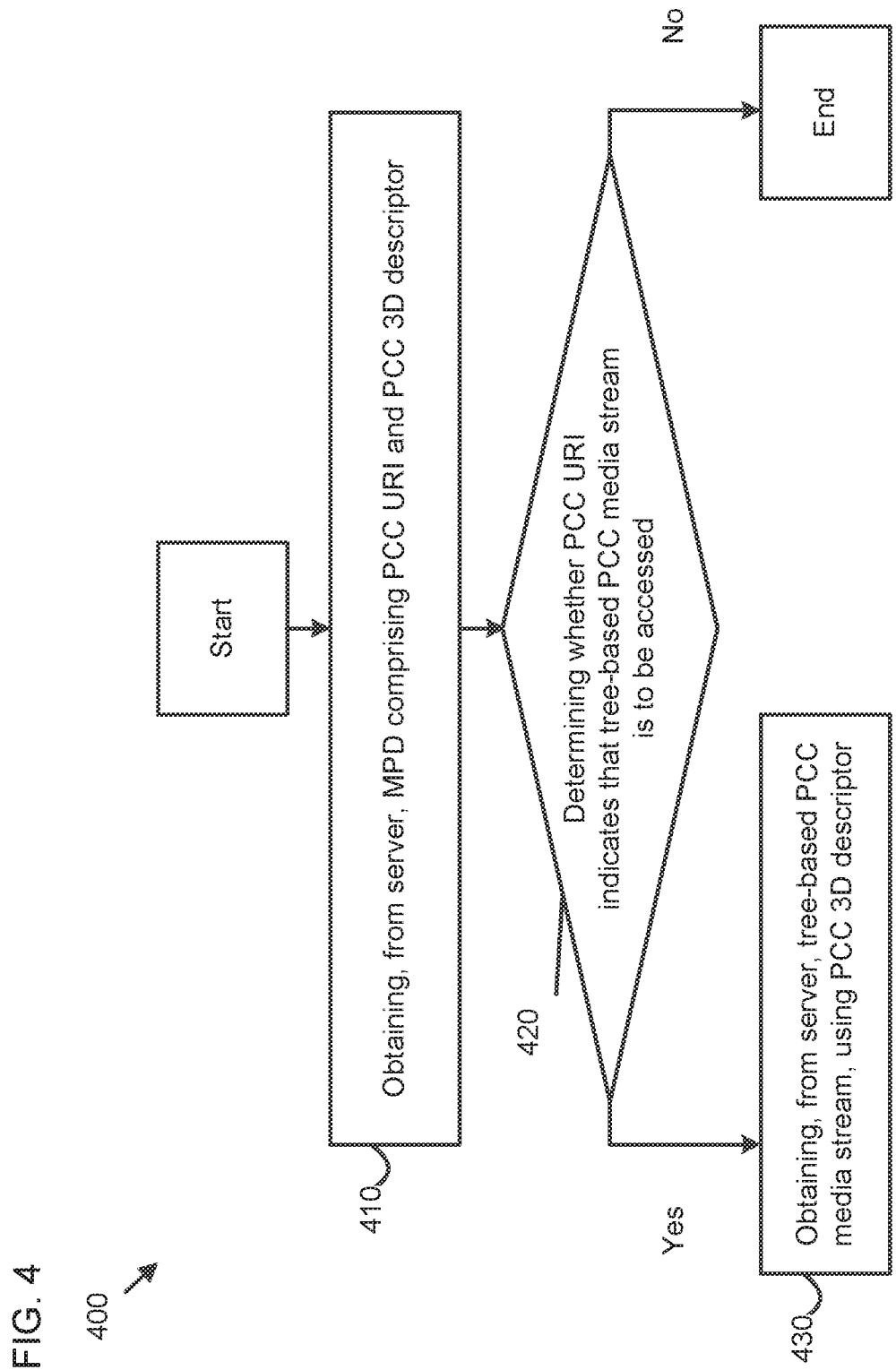
FIG. 4 is a flowchart of a method of obtaining a tree-based PCC media stream, using MPEG-DASH, according to embodiments.

FIG. 4 is a flowchart of a method 400 of obtaining a tree-based PCC media stream, using MPEG-DASH, according to embodiments. In some implementations, one or more process blocks of FIG. 4 may be performed by the platform 120 implementing the PCC streaming system 300. In some implementations, one or more process blocks of FIG. 4 may be performed by another device or a group of devices separate from or including the platform 120 implementing the PCC streaming system 300, such as the user device 110.

As shown in FIG. 4, in operation 410, the method 400 includes obtaining, from a server, a media representation description (MPD) comprising a PCC uniform resource indicator (URI) and a PCC three-dimensional (3D) descriptor.

In operation 420, the method 400 further includes determining whether the PCC URI comprised in the obtained MPD indicates that the tree-based PCC media stream is to be accessed.

In operation 430, the method 400 further includes, based on the PCC URI being determined to indicate that the tree-based PCC media stream is to be accessed, obtaining, from the server, the tree-based PCC media stream, using the PCC 3D descriptor comprised in the obtained MPD.

The MPD may further include a format of the tree-based PCC media stream.

The PCC 3D descriptor may include multiple descriptors respectively of a root (R), a tree level (L) and an order of a child (C) in the tree level, for the tree-based PCC media stream.

The tree-based PCC media stream may include any one or any combination of an octree-based, a k-dimensional tree-based and a quadtree-based PCC media stream.

The obtaining the tree-based PCC media stream may include, based on the PCC URI being determined to indicate that the tree-based PCC media stream is to be accessed, transmitting, to the server, a hypertext transfer protocol (HTTP) get message comprising the PCC 3D descriptor comprised in the obtained MPD.

The obtaining the tree-based PCC media stream may further include, based on the HTTP get message being transmitted, receiving, from the server, a HTTP response message comprising the tree-based PCC media stream.

The method may further include displaying the obtained tree-based PCC media stream.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
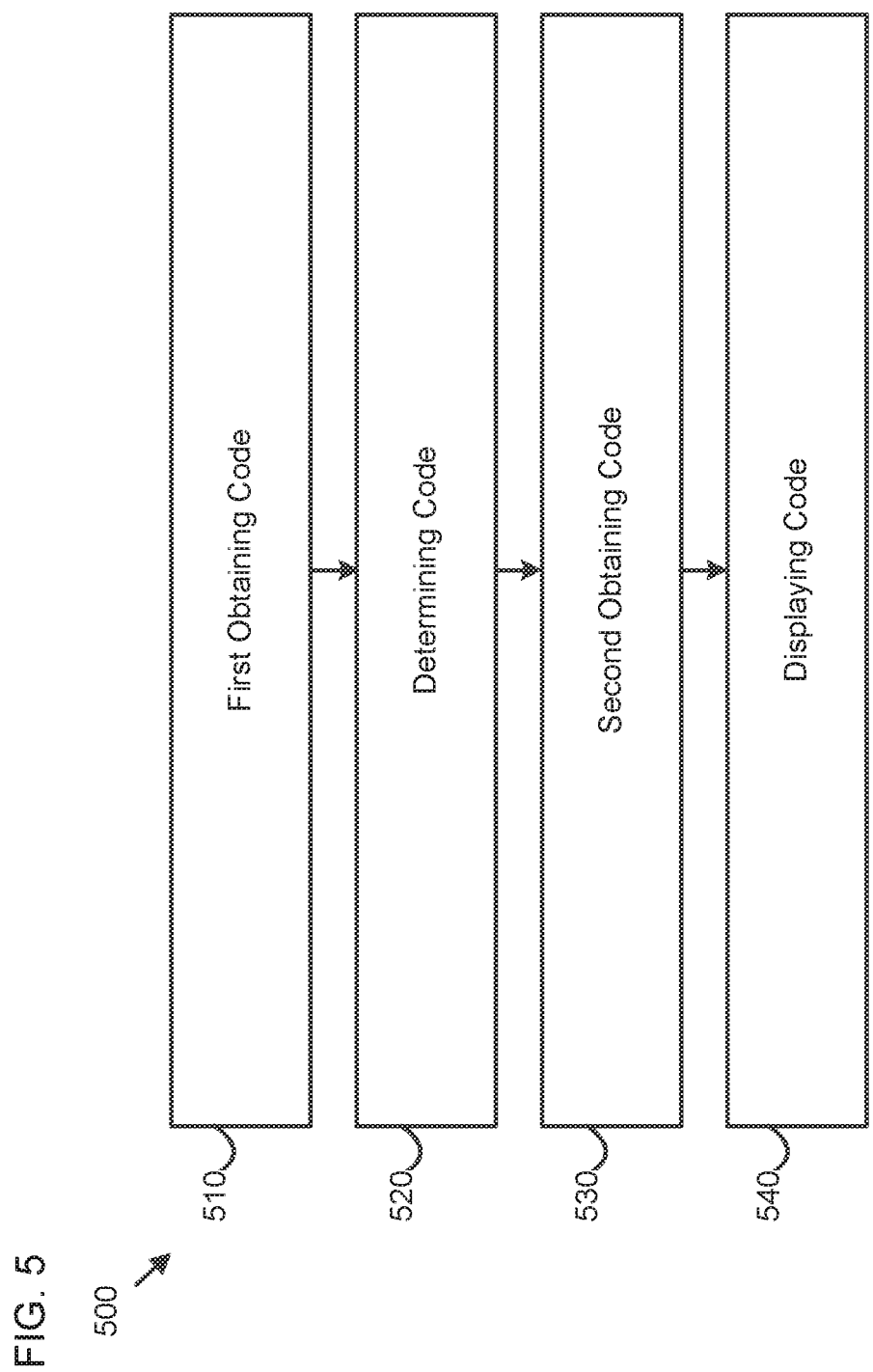
FIG. 5 is a block diagram of an apparatus for obtaining a tree-based PCC media stream, using MPEG-DASH, according to embodiments.

FIG. 5 is a diagram of an apparatus 500 for obtaining a tree-based PCC media stream, using MPEG-DASH, according to embodiments. As shown in FIG. 5, the apparatus 500 includes first obtaining code 510, determining code 520, second obtaining code 530 and displaying code 540.

The first obtaining code 510 is configured to cause at least one processor to obtain, from a server, a media representation description (MPD) comprising a PCC uniform resource indicator (URI) and a PCC three-dimensional (3D) descriptor;

The determining code 520 is configured to cause the at least one processor to determine whether the PCC URI comprised in the obtained MPD indicates that the tree-based PCC media stream is to be accessed.

The second obtaining code 530 is configured to cause the at least one processor to, based on the PCC URI being determined to indicate that the tree-based PCC media stream is to be accessed, obtain, from the server, the tree-based PCC media stream, using the PCC 3D descriptor comprised in the obtained MPD.

The MPD may further include a format of the tree-based PCC media stream.

The PCC 3D descriptor may include multiple descriptors respectively of a root (R), a tree level (L) and an order of a child (C) in the tree level, for the tree-based PCC media stream.

The tree-based PCC media stream may include any one or any combination of an octree-based, a k-dimensional tree-based and a quadtree-based PCC media stream.

The second obtaining code 530 may be further configured to cause the at least one processor to, based on the PCC URI being determined to indicate that the tree-based PCC media stream is to be accessed, control to transmit, to the server, a hypertext transfer protocol (HTTP) get message comprising the PCC 3D descriptor comprised in the obtained MPD.

The second obtaining code 530 may be further configured to cause the at least one processor to, based on the HTTP get message being transmitted, receive, from the server, a HTTP response message comprising the tree-based PCC media stream.

The displaying code 540 may be configured to cause the at least one processor to control to display the obtained tree-based PCC media stream.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of obtaining a tree-based point cloud compression (PCC) media stream using moving picture experts group (MPEG)-dynamic adaptive streaming over http (DASH), the method being performed by at least one processor, and the method comprising:
    obtaining, from a server, a media representation description (MPD) comprising a PCC uniform resource indicator (URI) and a PCC three-dimensional (3D) descriptor;
    determining whether the PCC URI comprised in the obtained MPD indicates that the tree-based PCC media stream is to be accessed; and
    based on the PCC URI being determined to indicate that the tree-based PCC media stream is to be accessed, obtaining, from the server, the tree-based PCC media stream, using the PCC 3D descriptor comprised in the obtained MPD.

2. The method of claim 1, wherein the MPD further comprises a format of the tree-based PCC media stream.

3. The method of claim 1, wherein the PCC 3D descriptor comprises multiple descriptors respectively of a root (R), a tree level (L) and an order of a child (C) in the tree level, for the tree-based PCC media stream.

4. The method of claim 1, wherein the tree-based PCC media stream comprises any one or any combination of an octree-based, a k-dimensional tree-based and a quadtree-based PCC media stream.

5. The method of claim 1, wherein the obtaining the tree-based PCC media stream comprises, based on the PCC URI being determined to indicate that the tree-based PCC media stream is to be accessed, transmitting, to the server, a hypertext transfer protocol (HTTP) get message comprising the PCC 3D descriptor comprised in the obtained MPD.

6. The method of claim 5, wherein the obtaining the tree-based PCC media stream further comprises, based on the HTTP get message being transmitted, receiving, from the server, a HTTP response message comprising the tree-based PCC media stream.

7. The method of claim 1, further comprising displaying the obtained tree-based PCC media stream.

8. An apparatus for obtaining a tree-based point cloud compression (PCC) media stream using moving picture experts group (MPEG)-dynamic adaptive streaming over http (DASH), the apparatus comprising:
    at least one memory configured to store program code; and
    at least one processor configured to read the program code and operate as instructed by the program code, the program code comprising:
        first obtaining code configured to cause the at least one processor to obtain, from a server, a media representation description (MPD) comprising a PCC uniform resource indicator (URI) and a PCC three-dimensional (3D) descriptor;
        determining code configured to cause the at least one processor to determine whether the PCC URI comprised in the obtained MPD indicates that the tree-based PCC media stream is to be accessed; and
        second obtaining code configured to cause the at least one processor to, based on the PCC URI being determined to indicate that the tree-based PCC media stream is to be accessed, obtain, from the server, the tree-based PCC media stream, using the PCC 3D descriptor comprised in the obtained MPD.

9. The apparatus of claim 8, wherein the MPD further comprises a format of the tree-based PCC media stream.

10. The apparatus of claim 8, wherein the PCC 3D descriptor comprises multiple descriptors respectively of a root (R), a tree level (L) and an order of a child (C) in the tree level, for the tree-based PCC media stream.

11. The apparatus of claim 8, wherein the tree-based PCC media stream comprises any one or any combination of an octree-based, a k-dimensional tree-based and a quadtree-based PCC media stream.

12. The apparatus of claim 8, wherein the second obtaining code is further configured to cause the at least one processor to, based on the PCC URI being determined to indicate that the tree-based PCC media stream is to be accessed, control to transmit, to the server, a hypertext transfer protocol (HTTP) get message comprising the PCC 3D descriptor comprised in the obtained MPD.

13. The apparatus of claim 12, wherein the second obtaining code is further configured to cause the at least one processor to, based on the HTTP get message being transmitted, receive, from the server, a HTTP response message comprising the tree-based PCC media stream.

14. The apparatus of claim 8, further comprising displaying code configured to cause the at least one processor to control to display the obtained tree-based PCC media stream.

15. A non-transitory computer-readable medium storing instructions that, when executed by at least one processor of an apparatus for obtaining a tree-based point cloud compression (PCC) media stream using moving picture experts group (MPEG)-dynamic adaptive streaming over http (DASH), cause the at least one processor to:
 obtain, from a server, a media representation description (MPD) comprising a PCC uniform resource indicator (URI) and a PCC three-dimensional (3D) descriptor;
 determine whether the PCC URI comprised in the obtained MPD indicates that the tree-based PCC media stream is to be accessed; and
 based on the PCC URI being determined to indicate that the tree-based PCC media stream is to be accessed, obtain, from the server, the tree-based PCC media stream, using the PCC 3D descriptor comprised in the obtained MPD.

16. The non-transitory computer-readable medium of claim 15, wherein the MPD further comprises a format of the tree-based PCC media stream.

17. The non-transitory computer-readable medium of claim 15, wherein the PCC 3D descriptor comprises multiple descriptors respectively of a root (R), a tree level (L) and an order of a child (C) in the tree level, for the tree-based PCC media stream.

18. The non-transitory computer-readable medium of claim 15, wherein the tree-based PCC media stream comprises any one or any combination of an octree-based, a k-dimensional tree-based and a quadtree-based PCC media stream.

19. The non-transitory computer-readable medium of claim 15, wherein the instructions further cause the at least one processor to, based on the PCC URI being determined to indicate that the tree-based PCC media stream is to be accessed, control to transmit, to the server, a hypertext transfer protocol (HTTP) get message comprising the PCC 3D descriptor comprised in the obtained MPD.

20. The non-transitory computer-readable medium of claim 19, wherein the instructions further cause the at least one processor to, based on the HTTP get message being transmitted, receive, from the server, a HTTP response message comprising the tree-based PCC media stream.

* * * * *